(12) United States Patent
Gondaliya (10) Patent No.: US 11,873,034 B2
(45) Date of Patent: Jan. 16, 2024

(54) REAR SUSPENSION MOUNTING ASSEMBLY (71) Applicant: Volvo Truck Corporation, Gothenburg (SE)

(72) Inventor: Himmat Gondaliya, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 269 days.

(21) Appl. No.: 17/441,423

(22) PCT Filed: Mar. 24, 2020

(86) PCT No.: PCT/EP2020/058242
§ 371 (c)(1),
(2) Date: Sep. 21, 2021

(87) PCT Pub. No.: WO2020/193588
PCT Pub. Date: Oct. 1, 2020

(65) Prior Publication Data
US 2022/0177054 A1    Jun. 9, 2022

(30) Foreign Application Priority Data
Mar. 25, 2019   (IN) .............................. 201941011391

(51) Int. Cl.
*B62D 33/06*   (2006.01)
*B62D 21/15*   (2006.01)
(Continued)

(52) U.S. Cl.
CPC ......... *B62D 33/0604* (2013.01); *B62D 21/15* (2013.01); *B62D 24/04* (2013.01); *E02F 9/163* (2013.01); *E02F 9/166* (2013.01)

(58) Field of Classification Search
CPC .... B62D 21/15; B62D 24/04; B62D 33/0604; B62D 33/0617; B62D 33/063; B62D 33/077; E02F 9/163; E02F 9/166
See application file for complete search history.

(56) References Cited

U.S. PATENT DOCUMENTS

| | | | |
|---|---|---|---|
| 5,209,316 A | | 5/1993 | Bauer |
| 5,388,884 A | * | 2/1995 | Keehner ................. F16F 1/38 |
| | | | 296/35.1 |

(Continued)

FOREIGN PATENT DOCUMENTS

| | | |
|---|---|---|
| CN | 101542046 A | 9/2009 |
| CN | 101618737 A | 1/2010 |

(Continued)

OTHER PUBLICATIONS

International Search Report and Written Opinion for International Patent Application No. PCT/EP2020/058242, dated Jul. 3, 2020, 14 pages.

(Continued)

*Primary Examiner* — Laura Freedman
(74) *Attorney, Agent, or Firm* — Withrow & Terranova, PLLC (57) ABSTRACT

The invention relates to a rear suspension mounting assembly adapted to connect a cab to a vehicle chassis. A lower bracket is provided with a first fastener for securing it to a vehicle chassis. An upper bracket is provided with a second fastener for securing it to a cab. First and second connecting means connect the upper bracket to the lower bracket, wherein the first connecting means are adapted to rigidly connect the upper bracket to the lower bracket, the second connecting means are adapted to movably connect the upper bracket to the lower bracket. When the brackets are connected by both connecting means, the upper bracket is rigidly connected to the lower bracket, wherein the first connecting means are dimensioned to break when subjected to a threshold force at which the second connecting means remain intact and allow the upper bracket to move relative to the lower bracket.

15 Claims, 4 Drawing Sheets

(51) Int. Cl.
  *B62D 24/04* (2006.01)
  *E02F 9/16* (2006.01)

(56) References Cited

U.S. PATENT DOCUMENTS

| | | | | |
|---|---|---|---|---|
| 5,553,911 | A * | 9/1996 | Bodin | B62D 33/0604 |
| | | | | 296/190.07 |
| 6,502,655 | B2 * | 1/2003 | Peddycord | B62D 33/06 |
| | | | | 180/69.21 |
| 7,140,669 | B2 * | 11/2006 | Bollinger | B62D 21/15 |
| | | | | 296/190.07 |
| 9,193,396 | B2 * | 11/2015 | Davisdon | B62D 33/067 |
| 10,286,964 | B2 * | 5/2019 | Venugopal | B62D 33/0617 |
| 2009/0256393 | A1 | 10/2009 | Kim | |
| 2010/0176624 | A1 | 7/2010 | Kamimae | |

FOREIGN PATENT DOCUMENTS

| | | |
|---|---|---|
| CN | 103153764 A | 6/2013 |
| CN | 203958322 U | 11/2014 |
| CN | 109466482 A | 3/2019 |
| EP | 0972698 A2 | 1/2000 |
| GB | 1495083 A | 12/1977 |
| JP | H08230724 A * | 9/1996 |
| JP | H11240463 A * | 9/1999 |
| JP | 2001039354 A | 2/2001 |
| JP | 2001151162 A * | 6/2001 |
| JP | 2009197445 A * | 9/2009 |
| WO | WO-2006100008 A1 * | 9/2006 ............. B62D 21/15 |
| WO | WO-2016041590 A1 * | 3/2016 ............. B62D 21/15 |

OTHER PUBLICATIONS

First Office Action for Chinese Patent Application No. 202080022430.7, dated Oct. 8, 2022, 10 pages.

\* cited by examiner

Fig. 4

REAR SUSPENSION MOUNTING ASSEMBLY

This application is a 35 USC 371 national phase filing of International Application No. PCT/EP2020/058242, filed Mar. 24, 2020, which claims the benefit of Indian Patent Application No. 201941011391, filed Mar. 25, 2019, the disclosures of which are incorporated herein by reference in their entireties.

TECHNICAL FIELD

The invention relates to a rear suspension mounting assembly adapted to connect a cab to a vehicle chassis. The invention also relates to a vehicle comprising such a rear suspension mounting assembly.

The invention can be applied in heavy-duty vehicles, such as trucks and construction equipment. Although the invention will be described with respect to an truck, the invention is not restricted to this particular vehicle, but may also be used in other vehicles such as construction equipment.

BACKGROUND

Heavy-duty vehicles, such as trucks, are normally provided with a cabin, commonly referred to as a cab, in which a driver can sit and operate the vehicle. The cab is connected to a vehicle chassis, i.e. one or more frames of a vehicle which holds the body of the vehicle.

Some trucks are designed in such way that, during a head-on collision or pendulum impact of a truck, the impact energy is transferred to some extent to cab movement and the rest to cab deformation. By allowing the cab to both move and become partly deformed during collision, the intrusion on the front side of the cab, basically the firewall region of the truck, can be reduced.

The above movement and deformation may be achieved by designing the front suspension of the cab, i.e. to fracture at a certain impact load. Firewall and floor members provide stiffness to reduce intrusion, while the fracture of the front suspension allows backward movement of the cab which in turn helps to reduce intrusion and hence provides better survival space.

Existing regulatory demands such as the United Nations Agreement concerning the adoption of uniform technical prescriptions for wheeled vehicles, ECE R29.02 and ECE R29.03, state that after the impact, the cab should be connected to the rest of the vehicle through any one cab mounting. In the existing solutions mentioned above, this requirement is met by an intact rear suspension with which the cab remains connected to the vehicle chassis.

Although the existing solutions provide certain safety to the driver upon front collision impact, it would be desirable to further improve the safety aspects of cabs subjected to front collision impact. In particular, it would be desirable to reduce firewall intrusion inside the drivers' compartment of the cab during a vehicle crash scenario, while fulfilling the safety regulatory demands like ECE 29.02 and ECE 29.03.

SUMMARY

An object of the invention is to provide a suspension mounting assembly which can be used for improving the safety aspect of a cab subjected to front collision impact.

According to a first aspect of the invention, the object is achieved by a rear suspension mounting assembly according to claim 1. The rear suspension mounting assembly is adapted to connect a cab to a vehicle chassis, wherein the rear suspension mounting assembly comprises:
  a lower bracket provided with a first fastener for securing the lower bracket to a vehicle chassis,
  an upper bracket provided with a second fastener for securing the upper bracket to a cab,
  first and second connecting means which connect the upper bracket to the lower bracket, wherein the first connecting means are adapted to rigidly connect the upper bracket to the lower bracket, and the second connecting means are adapted to movably connect the upper bracket to the lower bracket,
  wherein when the upper bracket is connected to the lower bracket by both the first and the second connecting means, the upper bracket is rigidly connected to the lower bracket,
  wherein the first connecting means are dimensioned to break when subjected to a threshold force at which the second connecting means remain intact and allow the upper bracket to move relative to the lower bracket.

The invention is based on the realization that in the case of a front collision, a further rearward movement of the cab may be provided by allowing a part of a rear suspension to be rearwardly movable with the cab while remaining, via another part of the rear suspension, connected to the vehicle chassis, thereby enabling further movement of the cab while fulfilling regulatory demands. Thus, existing solutions which have front suspensions designed to fracture upon certain impact, may be complemented by a rear suspension mounting assembly according to the present invention. In other words, in addition to the rearward movement allowed by existing solutions, by using a rear suspension mounting assembly according to the present invention, a further rearward movement will be allowed, thereby more of the impact energy will be transferred to cab movement and less of the impact energy will be transferred to deformation of the cab (intrusion of the firewall).

In this application, terms such as upper, lower, above, below, relate to a normal mounting of the rear suspension mounting assembly. In particular, the terms may be related to a vehicle standing with its wheels on a ground, such as a road. For instance, the cab will under normal circumstance extend to a level above the chassis. Thus, at least a portion of the upper bracket is intended to be located at a vertically higher level relative to the ground than the lower bracket.

According to at least one exemplary embodiment, the second connecting means are adapted to rotatably connect the upper bracket to the lower bracket, thereby enabling rotation of the upper bracket relative to the lower bracket when the first connecting means break at said threshold force. An advantage of this is that a controlled rearward movement of the cab is enabled. Even a small angular rotation at the connection between the upper bracket and the lower bracket, may result in a rather large movement of the cab. The longer the upper bracket member is, the larger the leverage effect (angular rotation vs. cab movement) may be.

According to at least one least one exemplary embodiment, the second connecting means comprises a guiding slot and a protruding element which protrudes into the guiding slot, wherein one of the upper bracket and the lower bracket is provided with the guiding slot, wherein the other one of the upper bracket and the lower bracket is provided with the protruding element, wherein the protruding element is enabled to move along the slot when the first connecting means break at said threshold force, thereby moving the upper bracket relative to the lower bracket. This also has the advantage of providing a controlled movement.

According to at least one exemplary embodiment, said guiding slot is curved for guiding the protruding element in a curved path, thereby enabling the upper bracket to rotate relative to the lower bracket. This also has the advantage of providing a controlled movement. Furthermore, even a small movement of the protruding element in the curved guiding slot may, due to the leverage effect, result in a large rearward movement at the upper end of the upper bracket, and therefore a large rearward movement of the cab.

According to at least one exemplary embodiment, said guiding slot extends between two guiding slot edges, wherein at least one of the guiding slot edges limits the movement of the protruding element, and thereby limits the movement of the upper bracket relative the lower bracket after allowable rotation of the upper bracket. This is advantageous since a maximum desired relative movement between the upper bracket and the lower bracket may be defined, for instance in order to find a proper balance between impact energy converted into cab movement relative to impact energy converted into cab deformation. Additionally, by avoiding an unrestricted cab movement, the risk of the cab colliding with surrounding interfaces (such as load body at backside, engine assembly parts at bottom of the cab, etc.) is reduced.

According to at least one exemplary embodiment, one of the upper bracket and the lower bracket is provided with the protruding element, and the other one of the upper bracket and the lower bracket is provided with the guiding slot, wherein the guiding slot forms a groove or hole in that bracket. By integrating the guiding slot in one of the brackets the number of components used may be kept low. Furthermore, the material thickness of the bracket may be appropriately dimensioned so that the material strength is sufficient, even though a groove is provided in the bracket material.

According to at least one exemplary embodiment, one of the upper bracket and the lower bracket is provided with the protruding element, and the other one of the upper bracket and the lower bracket comprises a main part and a guiding part attached to the main part, wherein the guiding slot is provided in the guiding part. This is advantageous since the size of the guiding part, and therefore the extension of the guiding slot, can be designed less independently from the dimensions and material strength of the main part, than if the guiding slot would form an integral part of the main part.

According to at least one exemplary embodiment, the second connecting means comprises a pivot axle extending through both the upper bracket and the lower bracket, wherein the upper bracket is enabled to pivot around the pivot axle relative to the lower bracket when the first connecting means break at said threshold force. By this arrangement, a simple connection is provided between the upper bracket and the lower bracket.

According to at least one exemplary embodiment, the second connecting means is provided with a resilient element for providing a resilient resistance to the relative motion between the upper bracket and the lower bracket. By selecting an appropriate resiliency of the resilient element a desired rearward movement can be limited and somewhat dampened.

According to at least one exemplary embodiment, the pivot axle is provided with said resilient element, such as a torsional spring, for providing rotational resistance. This may be a simple way to limit the rearward movement, instead of for example, providing a slot with limiting edges.

According to at least one exemplary embodiment, the first connecting means comprises one or more bolts for connecting the upper bracket to the lower bracket, wherein the one or more bolts are dimensioned to break when subjected to said threshold force. By appropriately selecting the dimensions of the one or more bolts, it is possible to predict at how large force will they break. For instance, a bolt having a thicker shank will normally provide a higher threshold force than a bolt having a thinner shank. Depending on the type of vehicle and the type of cab, a desired threshold force may be determined, and based on the desired threshold force appropriately dimensioned bolts may be selected.

According to at least one exemplary embodiment, the first and second fasteners are spaced from the first and second connecting means. Thus, the first and the second fixation to the cab and the vehicle chassis may configured independently of the connection between the upper and lower bracket. If one of the connecting means would be used for both connecting the upper and lower brackets to each other and for connecting for example the lower bracket to the chassis, would result in a lower design freedom and adaptation to different vehicle and cab types.

According to at least one exemplary embodiment, the upper bracket is configured to extend upwards from the lower bracket, when the rear suspension mounting assembly is mounted and connects the cab to the vehicle chassis. By selecting the connecting point or points between the upper and lower brackets, i.e. by selecting the location for the second connecting means, and by selecting the length of the upper bracket, a suitable leverage effect may be obtained if the upper bracket is to rotate upon impact relative to the lower bracket.

According to at least one exemplary embodiment, the upper bracket is elongated and has a lower end and an upper end, the lower end being connected to the lower bracket, and the upper end being adapted to be connected to the cab, wherein its longitudinal extension extends from the lower end to the upper end. Again, by selecting a suitable length of the upper bracket and the location of the second connecting means, a suitable leverage effect may be obtained if the upper bracket is to rotate upon impact relative to the lower bracket.

According to a second aspect of the invention, a vehicle is provided. The vehicle comprises:
 a cab,
 a chassis, and
 a rear suspension mounting assembly according to the first aspect of the invention (including any embodiment thereof) for connecting the rear of the cab to the chassis.

According to at least one exemplary embodiment of the second aspect, the vehicle further comprises a front leg or front suspension mounting assembly for connecting the front of the cab to the chassis, wherein said front leg or front suspension mounting assembly, or parts thereof, are dimensioned to break at a frontal collision producing said threshold force in order to allow the cab to move rearwardly relative to chassis. Thus, by providing a vehicle with both a breakable front leg or front suspension mounting assembly and a rear suspension mounting assembly, the range of the rearward movement is extended compared to if the front leg or front suspension mounting assembly would be used in combination with a non-movable rear suspension mounting assembly.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
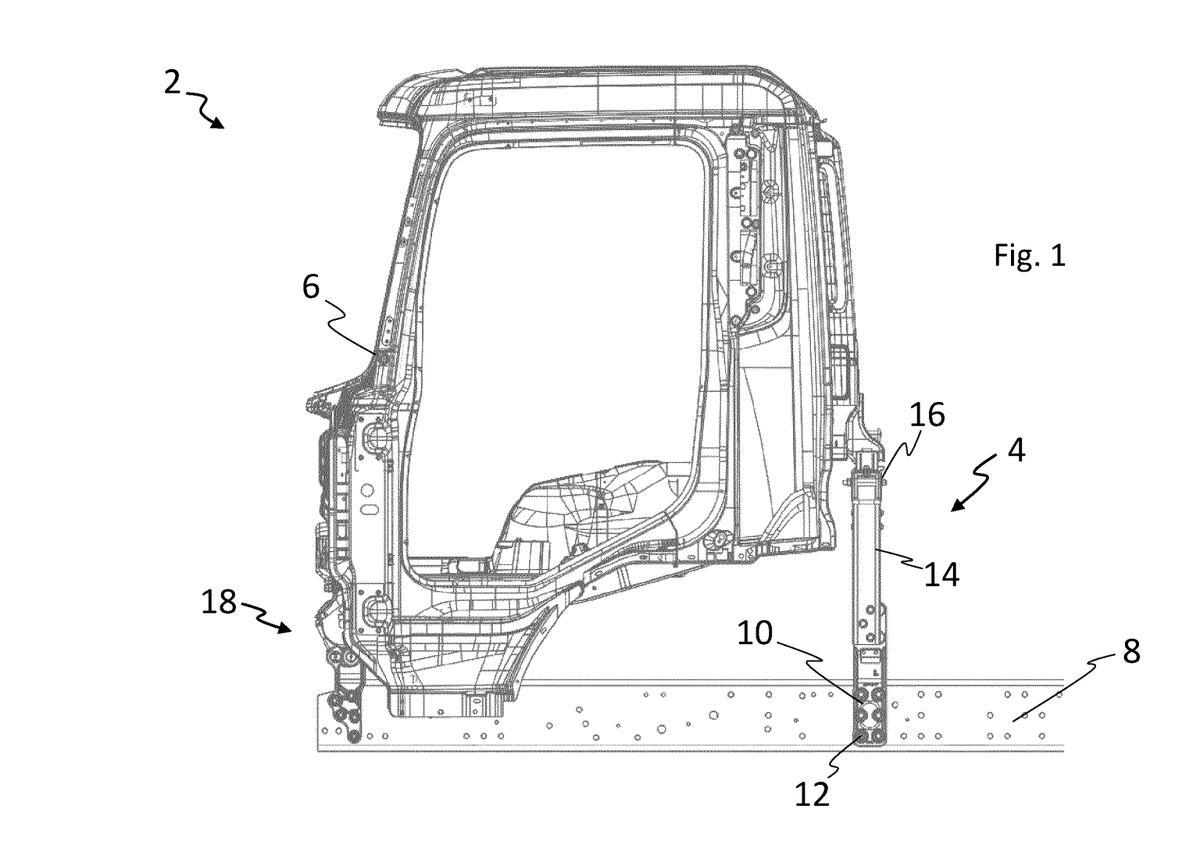
FIG. 1 is a schematic illustration of a part of vehicle, wherein a rear suspension mounting assembly connects a cab to a chassis in accordance with at least one exemplary embodiment of the invention.

FIG. 1 is a schematic illustration of a part of vehicle 2, wherein a rear suspension mounting assembly 4 connects a cab 6 to a chassis 8 in accordance with at least one exemplary embodiment of the invention. Although the vehicle 2 is illustrated in the form of a truck, other types of vehicles, such as construction equipment may also be provided with the inventive rear suspension mounting assembly 4.

The rear suspension mounting assembly 4 comprises a lower bracket 10 provided with a first fastener 12 for securing the lower bracket to the vehicle chassis. The first fastener 12 is herein illustrated in the form of a plurality of bolts which fixate the lower bracket 10 to the vehicle chassis 8. Although six bolts are shown, other number of bolts is also conceivable. Furthermore, other or additional types of fasteners are also conceivable. The rear suspension mounting assembly 4 further comprises an upper bracket 14 provided with a second fastener 16 for securing the upper bracket 14 to the cab 6. The second fastener 16 may, for instance, comprise any aggregate of components, including bolts, nuts, bracket members, flexible members such as dampers and/or springs, etc. for fixating the upper bracket 14 to the cab 6.

The upper bracket 14 is connected to the lower bracket 10 by first connecting means and second connecting means, which will be further discussed with reference to FIGS. 2, 2a, 2b, 3, 3a, 3b and 4.

Before turning to those figures, it should be pointed out that in addition to the inventive rear suspension mounting assembly 4, the vehicle may further comprise a front leg or front suspension mounting assembly 18 for connecting the front of the cab 6 to the chassis 8, as illustrated in FIG. 1. Such a front leg or front suspension mounting assembly 18, or parts thereof, may be dimensioned in a known manner to break at a frontal collision which produces a defined threshold force in order to allow the cab 6 to move rearwardly relative to chassis 8. By combining the inventive movable rear suspension mounting assembly 4 with a known front suspension mounting assembly 18 the range of the rearward movement is extended compared to if front suspension mounting assembly 18 would be used in combination with a non-movable rear suspension mounting assembly.

Figure 2:
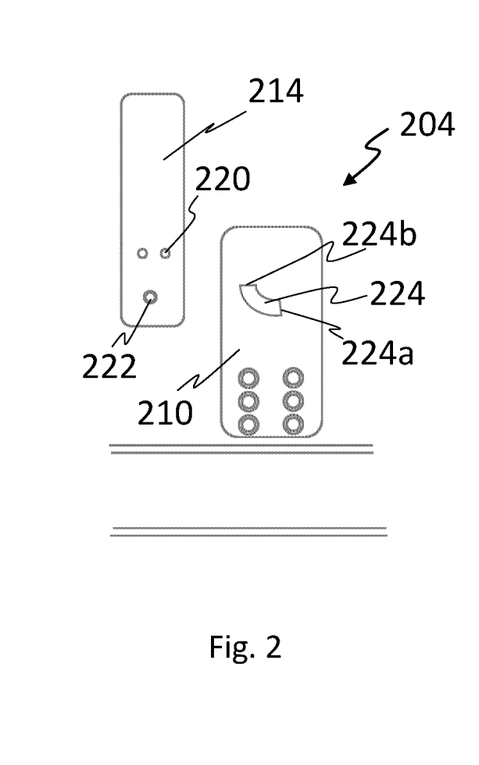
FIGS. 2, 2a and 2b illustrate schematically a rear suspension mounting assembly in accordance with at least one exemplary embodiment of the invention.
Figure 2A:
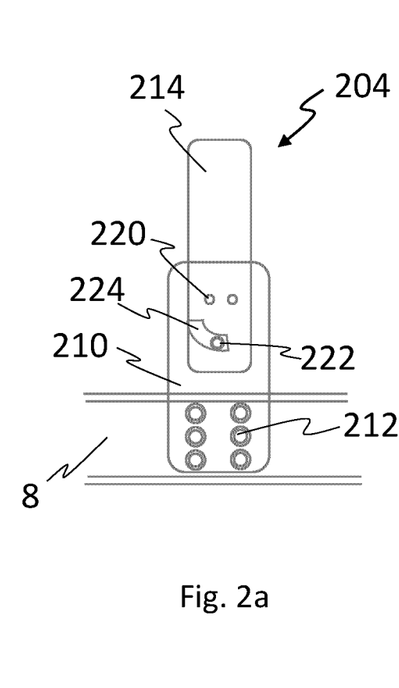
Figure 2B:
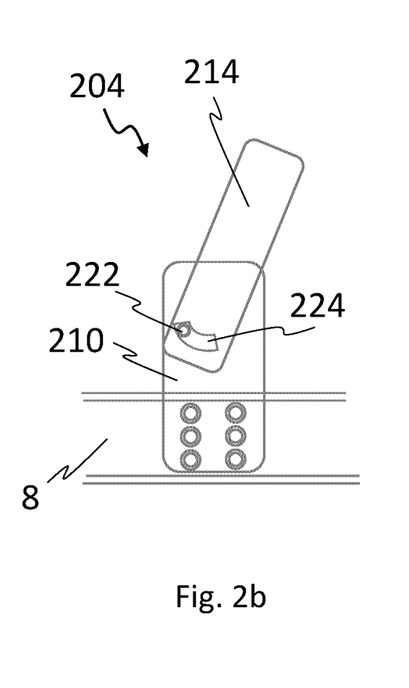

FIGS. 2, 2a and 2b illustrate schematically a rear suspension mounting assembly 204 in accordance with at least one exemplary embodiment of the invention.

In FIG. 2, the upper bracket 214 and the lower bracket 210 are illustrated schematically before they are connected to each other and before being mounted to a vehicle.

FIG. 2a illustrates schematically a normal operating state, when the rear suspension mounting assembly 204 has been mounted to the vehicle and connects the cab to the chassis 8. Please note that for simplification and explanatory purposes, the cab is not illustrated and only part of the upper bracket 214 is illustrated. Thus, FIG. 2a shows that the lower bracket 210 has been secured to the chassis 8 by means of a first fastener 212 (here illustrated as including six bolts) and that the upper bracket 214 has been connected to the lower bracket 210.

FIG. 2b illustrates a front collision state, i.e. after the cab has been subjected to an impact. In this state the cab (not illustrated) and the upper bracket 214 has rotated relative to the lower bracket 210 and the chassis 8.

First connecting means 220 are adapted to rigidly connect the upper bracket 214 to the lower bracket 210. In FIGS. 2 and 2a the first connecting means 220 are illustrated as a pair of bolts, however, other types of first connecting means are also conceivable as long as they rigidly connect the brackets and can break the connection at a desired threshold force, i.e. when a front collision of a certain magnitude occurs.

Second connecting means 222, 224 are adapted to movably connect the upper bracket 214 to the lower bracket 210. In FIGS. 2, 2a and 2b, the second connecting means 222, 224 are illustrated as knob 222 on the upper bracket 214 which is configured to be guided by a curved slot 224 in the lower bracket 210. However, in other embodiments the curved slot could be provided in the upper bracket and the knob in the lower bracket. Furthermore, various alternative movable connections are conceivable. For instance, the slot does not necessarily need to be curved but can be linear, parallel with the ground or inclined relative to the ground, etc. Furthermore, instead of a knob, other types of protruding elements which protrude into the guiding slot are conceivable and is enabled to move along the guiding slot when the first connecting means 220 break at said threshold force. The protruding element may for instance be a pin or an axle.

When the upper bracket 214 is connected to the lower bracket 210 by both the first connecting means 220 and the second connecting means 222, 224, the upper bracket 214 is rigidly connected to the lower bracket 210, as illustrated in FIG. 2a. The first connecting means 220 are dimensioned to break when subjected to a threshold force at which the second connecting means 222, 224 remain intact and allow the upper bracket 214 to move relative to the lower bracket 210, as illustrated in FIG. 2b.

It should be noted that even though the first connecting means 220 have been illustrated as being located above the second connecting means 222, 224, it would be conceivable in other embodiments to instead have the second connecting means located above the first connecting means.

As can be seen from FIG. 2b, due to the curvature of the guiding slot 224, the second connecting means 222, 224 rotatably connect the upper bracket 214 to the lower bracket 210, thereby enabling rotation of the upper bracket 214 relative to the lower bracket 210 due to the curved path that the knob 222 travels in the guiding slot 224 when the first connecting means 220 break at said threshold force. In some exemplary embodiments, as for instance shown in FIGS. 2, 2a and 2b, the guiding slot 224 starts at a low position, for instance centrally on the bracket (in the illustration on the lower bracket 210), and is then curved upwardly and towards the front direction of the vehicle. Other curved extensions are however also possible.

Thus, the guiding slot 224 extends between two guiding slot edges 224a, 224b (see FIG. 2). The guiding slot edges 224a, 224b limit the movement of the protruding element (knob 222), and thereby limit the movement of the upper bracket 214 relative the lower bracket 210 after allowable rotation of the upper bracket 214.

In the exemplary embodiment illustrated in FIGS. 2, 2a and 2b, the guiding slot 224 forms a groove or hole in the lower bracket 210 itself. However, in other exemplary embodiments, the guiding slot may be formed in a separate part which is attached to one of the upper bracket and the lower bracket, wherein the protruding element to be guided in the guiding slot is provided on the other one of the upper bracket and the lower bracket. Such an exemplary embodiment is illustrated in FIGS. 3, 3a and 3b.

Figure 3:
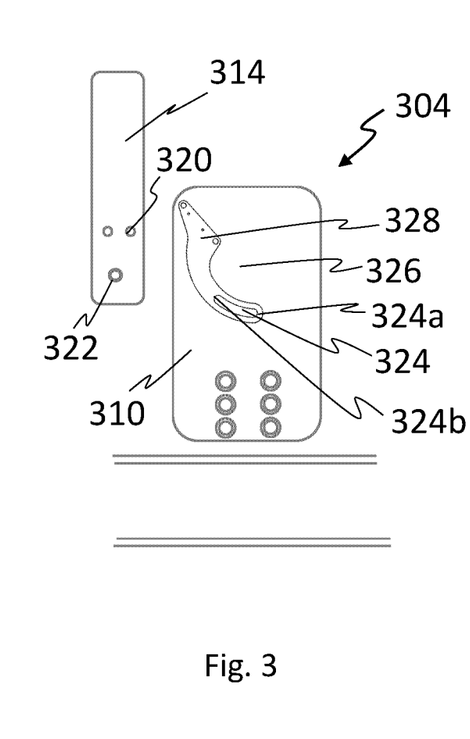
FIGS. 3, 3a and 3b illustrate schematically a rear suspension mounting assembly in accordance with at least another exemplary embodiment of the invention.
Figure 3A:
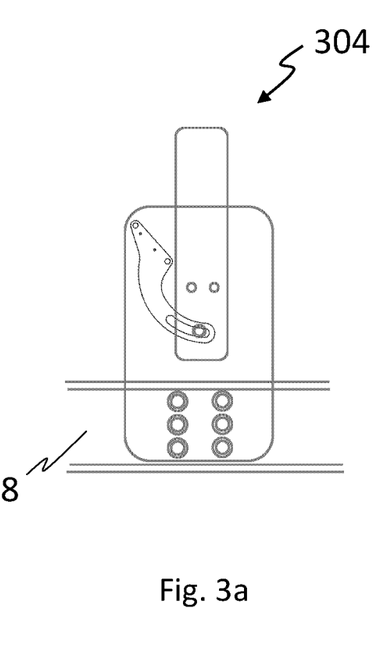
Figure 3B:
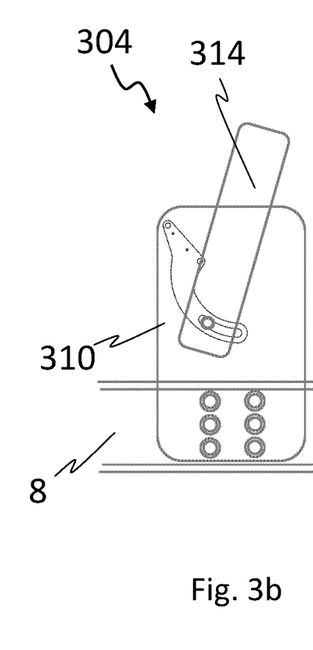

Thus, FIGS. 3, 3a and 3b illustrate schematically a rear suspension mounting assembly 304 in accordance with at least another exemplary embodiment of the invention.

FIG. 3 illustrates that the upper bracket 314 is provided with a protruding element, such as a knob 322, similarly to the upper bracket 214 and knob 222 in FIG. 2. In FIG. 3, the lower bracket 310 comprises a main part 326 and a guiding part 328 attached to the main part 326, by appropriate fixing means such as screws, bolts etc., wherein the guiding slot 324 (with its guiding slot edges 324a, 324b) is provided in the guiding part 328. The guiding principle, however, basically corresponds to the one illustrated and discussed in connection with FIGS. 2, 2a and 2b, and accordingly FIG. 3a illustrates a normal operating state, when the rear suspension mounting assembly 304 has been mounted to the vehicle and connects the cab to the chassis 8, and FIG. 3b illustrates a front collision state, i.e. after the cab has been subjected to an impact. In this state the cab (not illustrated) and the upper bracket 314 has rotated relative to the lower bracket 310 and the chassis 8.

Although a guiding slot as illustrated in for example FIGS. 2, 2a, 2b, 3, 3a and 3b is beneficial for controlled movement of the upper bracket and the cab, other embodiments are also conceivable.

Figure 4:
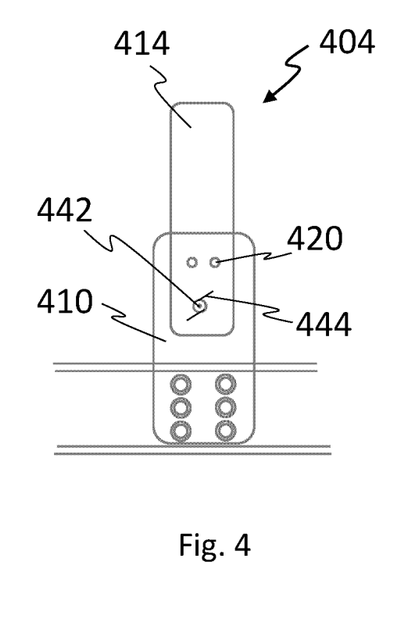
FIG. 4 illustrates schematically a rear suspension mounting assembly in accordance with yet another exemplary embodiment of the invention.

FIG. 4 illustrates schematically a rear suspension mounting assembly 404 in accordance with yet another exemplary embodiment of the invention. In this simple illustration, the second connecting means comprises a pivot axle 442 extending through both the upper bracket 414 and the lower bracket 410. The upper bracket 414 is thus enabled to pivot around the pivot axle 442 relative to the lower bracket 410 when the first connecting means break 420 at said threshold force. Since there are no movement-limiting edges as for the guiding slot in the previously discussed figures, a different movement-limiting mechanism may be provided. For instance, the pivot axle 442 may be provided with a resilient element 444, such as a torsional spring, for providing rotational resistance to the relative motion between the upper bracket 414 and the lower bracket 410. It should be understood that resilient elements are also conceivable in other exemplary embodiments for limiting the relative motion between the upper bracket and the lower bracket. For instance, even the embodiments with the guiding slots may be provided with appropriate resilient elements, if desired, for controlled movement of the knob within the guiding slot.

As illustrated in the drawings the first and second fasteners are spaced from the first and second connecting means. Furthermore, the upper bracket is configured to extend upwards from the lower bracket, when the rear suspension mounting assembly is mounted and connects the cab to the vehicle chassis. In FIG. 1 it can be seen that the upper bracket 14 is elongated and may suitably be longer than the lower bracket 10. The upper end of the upper bracket is adapted to be connected to the cab. However, it is to be understood that the present invention is not limited to the embodiments described above and illustrated in the drawings; rather, the skilled person will recognize that many changes and modifications may be made within the scope of the appended claims.

The invention claimed is:

1. A rear suspension mounting assembly, comprising:
a lower bracket provided with a first fastener for securing the lower bracket to a vehicle chassis;
an upper bracket provided with a second fastener for securing the upper bracket to a cab; and
first and second connectors that connect the upper bracket to the lower bracket, wherein the first connector is configured to rigidly connect the upper bracket to the lower bracket, and the second connector is configured to movably connect the upper bracket to the lower bracket;
wherein when the upper bracket is connected to the lower bracket by both the first and the second connectors, the upper bracket is rigidly connected to the lower bracket; and
wherein the first connector is dimensioned to break when subjected to a threshold force at which the second connector remains intact and allows the upper bracket to move relative to the lower bracket.

2. The rear suspension mounting assembly of claim 1, wherein the second connector is configured to rotatably connect the upper bracket to the lower bracket, thereby enabling rotation of the upper bracket relative to the lower bracket when the first connector breaks at the threshold force.

3. The rear suspension mounting assembly of claim 1, wherein the second connector comprises a guiding slot and a protruding element that protrudes into the guiding slot, wherein one of the upper bracket and the lower bracket is provided with the guiding slot, wherein the other one of the upper bracket and the lower bracket is provided with the protruding element, wherein the protruding element is enabled to move along the slot when the first connector breaks at the threshold force, thereby moving the upper bracket relative to the lower bracket.

4. The rear suspension mounting assembly of claim 3, wherein the guiding slot is curved for guiding the protruding element in a curved path, thereby enabling the upper bracket to rotate relative to the lower bracket.

5. The rear suspension mounting assembly of claim 3, wherein the guiding slot extends between two guiding slot edges, wherein at least one of the guiding slot edges limits the movement of the protruding element, and thereby limits the movement of the upper bracket relative the lower bracket after allowable rotation of the upper bracket.

6. The rear suspension mounting assembly of claim 3, wherein the guiding slot forms a groove or hole in the one of the upper bracket and the lower bracket.

7. The rear suspension mounting assembly of claim 3, wherein the one of the upper bracket and the lower bracket comprises a main part and a guiding part attached to the main part, wherein the guiding slot is provided in the guiding part.

8. The rear suspension mounting assembly of claim 1, wherein the second connector comprises a pivot axle extending through both the upper bracket and the lower bracket, wherein the upper bracket is enabled to pivot around the pivot axle relative to the lower bracket when the first connector breaks at the threshold force.

9. The rear suspension mounting assembly of claim 1, wherein the second connector is provided with a resilient element for providing a resilient resistance to the relative motion between the upper bracket and the lower bracket.

10. The rear suspension mounting assembly of claim 1, wherein the first connector comprises one or more bolts for connecting the upper bracket to the lower bracket, wherein the one or more bolts are dimensioned to break when subjected to the threshold force.

11. The rear suspension mounting assembly of claim 1, wherein the first and second fasteners are spaced from the first and second connectors.

12. The rear suspension mounting assembly of claim 1, wherein the upper bracket is configured to extend upwards from the lower bracket, when the rear suspension mounting assembly is mounted and connects the cab to the vehicle chassis.

13. The rear suspension mounting assembly of claim 1, wherein the upper bracket is elongated and has a lower end and an upper end, the lower end being connected to the lower bracket, and the upper end being adapted to be connected to the cab.

14. A vehicle comprising:
a cab;
a chassis; and
a rear suspension mounting assembly comprising:
    a lower bracket provided with a first fastener for securing the lower bracket to a vehicle chassis;
    an upper bracket provided with a second fastener for securing the upper bracket to a cab; and
    first and second connectors which connect the upper bracket to the lower bracket, wherein the first connector is configured to rigidly connect the upper bracket to the lower bracket, and the second connector is configured to movably connect the upper bracket to the lower bracket;
    wherein when the upper bracket is connected to the lower bracket by both the first and the second connectors, the upper bracket is rigidly connected to the lower bracket; and
    wherein the first connector is dimensioned to break when subjected to a threshold force at which the second connector remains intact and allows the upper bracket to move relative to the lower bracket.

15. The vehicle of claim 14, further comprising a front leg or front suspension mounting assembly for connecting a front of the cab to the chassis, wherein the front leg or front suspension mounting assembly is dimensioned to break at a frontal collision producing the threshold force in order to allow the cab to move rearwardly relative to chassis.

* * * * *